(12) United States Patent
Li et al.

(10) Patent No.: US 7,712,043 B2
(45) Date of Patent: May 4, 2010

(54) SYSTEM AND METHOD FOR DYNAMICALLY VIEWING AND NAVIGATING HIERARCHICAL DATA

(75) Inventors: Jin Li, Toronto (CA); David K. Modjeska, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/697,593

(22) Filed: Apr. 6, 2007

(65) Prior Publication Data
US 2008/0250345 A1    Oct. 9, 2008

(51) Int. Cl.
*G06F 3/00* (2006.01)

(52) U.S. Cl. ............ 715/781; 715/765; 715/788; 715/801; 715/753

(58) Field of Classification Search ......... 715/708, 715/709, 711, 713, 715, 764, 765, 769, 781, 715/783, 784, 788, 800, 801, 835, 853, 854, 715/855, 856, 860, 861, 866, 977
See application file for complete search history.

(56) References Cited

U.S. PATENT DOCUMENTS

| | | | |
|---|---|---|---|
| 5,546,529 A | | 8/1996 | Bowers et al. |
| 5,644,740 A | * | 7/1997 | Kiuchi ................ 715/853 |
| 6,154,750 A | * | 11/2000 | Roberge et al. ......... 707/104.1 |
| 6,204,850 B1 | * | 3/2001 | Green ................ 715/850 |
| 6,285,366 B1 | | 9/2001 | Ng et al. |
| 6,359,637 B1 | | 3/2002 | Perkins et al. |
| 6,421,072 B1 | * | 7/2002 | Ku et al. ............... 715/804 |
| 6,458,081 B1 | | 10/2002 | Matsui et al. |
| 6,691,282 B1 | | 2/2004 | Rochford et al. |
| 6,868,525 B1 | | 3/2005 | Szabo |
| 6,934,935 B1 | * | 8/2005 | Bennett et al. .......... 717/127 |
| 6,944,818 B2 | * | 9/2005 | Newman et al. ......... 715/234 |
| 2002/0059003 A1 | | 5/2002 | Ruth et al. |
| 2004/0066413 A1 | * | 4/2004 | Ahlqvist ............... 345/781 |
| 2006/0129977 A1 | * | 6/2006 | Segar et al. ........... 717/110 |

OTHER PUBLICATIONS

Turetken et al., "Supporting Systems Analysis and Design Through Fisheye Views: Demonstrating the Usefulness of Integrating Context-Based Views into the Systems Analysis and Design Process", Communications of the ACM, Sep. 2004, vol. 47, No. 9, pp. 72-77.

\* cited by examiner

*Primary Examiner*—X. L. Bautista
(74) *Attorney, Agent, or Firm*—Daniel McLoughlin; Hoffman Warnick LLC

(57) ABSTRACT

A system, method, program product and service for navigating and displaying hierarchically structured data. A system is provided that includes: a graphical data display system for displaying a structured diagram having a plurality of nodes; a navigation system for allowing a user to launch a viewport at a selected node within the structured diagram to view subnodes of the selected node; and a context maintenance system that maintains a visual context between each of the plurality of nodes and subnodes within the structured diagram.

21 Claims, 8 Drawing Sheets

SYSTEM AND METHOD FOR DYNAMICALLY VIEWING AND NAVIGATING HIERARCHICAL DATA

FIELD OF THE INVENTION

This disclosure relates generally to systems for viewing and navigating structured data, and more specifically to an interface for displaying and navigating hierarchically structured data while preserving the overall context of the data.

BACKGROUND OF THE INVENTION

There are numerous applications in which users work with complex, structured, technical information. Often, the information is structured hierarchically with data being provided at different levels. Many applications utilize some type of graphical user interface (GUI) that can display information in a graphical format that makes the information more understandable for the user. For example, in designing a software application using a unified modeling language (UML), a user typically utilizes a high level flow diagram view for designing the overall architecture of the application, and then uses lower level diagrams or data objects to implement the more granular routines and processes. In other applications, a tree structure view may be provided to display an overall structure of a database, and node views may be provided to display sub-tree structures or actual data.

When working with such structured information, users must be able to rapidly and easily navigate multiple diagram levels, and adjust views using visual navigation tools. Otherwise, users can become lost, confused, or delayed. One of the limitations with current systems for viewing such data is that it is very easy for a user to lose the overall context of data as they drill up and down through different levels (i.e., how does a child level node relate to the overall structure). For example, in a file browser application, a new window is presented each time a user drills down into a subdirectory, but information in the window itself does not provide any overall context. Instead, the user must view a separate window (such as an address window, or tree window) to understand the context of the information. Thus, the parent-child relationship is not directly linked to the information itself.

Other applications have similar limitations. For instance, in some drawing or painting programs, users can select or view hidden objects, but only at their original scale. Accordingly, a single display cannot readily display both the information and the overall context of the information. Still other applications allow users to rapidly zoom in and out of diagram nodes; but after zooming, the parent context is no longer displayed.

Accordingly, a need exists for a system and method for displaying and navigating structured information while maintaining the overall context of the information.

SUMMARY OF THE INVENTION

The present invention relates to a system, method, program product and service for displaying and navigating hierarchically structured data while preserving the overall context of the data. Aspects of the invention include displaying a hierarchically structured diagram, and providing the ability to launch viewports to allow a user to inspect nested details. As viewports are opened, the overall context of the structured diagram is maintained, e.g., with arrows, lines, nested viewports, etc. Each viewport can be manipulated, e.g., opened, moved in either content or display, resized, zoomed, dragged, closed, etc., as needed. A viewport can also magnify items at a lower structural level for easy viewing. When several viewports are opened, the result can be a set of nested, exploding views.

In one embodiment, there is a system for displaying and navigating hierarchically structured data, comprising: a graphical data display system for displaying a structured diagram having a plurality of nodes; a navigation system for allowing a user to launch a viewport at a selected node within the structured diagram to view subnodes of the selected node; and a context maintenance system that maintains a visual context between each of the plurality of nodes and subnodes within the structured diagram.

In a second embodiment, there is a method for displaying and navigating hierarchically structured data, comprising: displaying a structured diagram having a plurality of nodes; launching a viewport at a selected node within the structured diagram to view subnodes of the selected node; and maintaining a visual context between each of the plurality of nodes and subnodes within the structured diagrams In a third embodiment, there is a computer-readable medium storing computer instructions, which when executed, enables a computer system to provide an interface for displaying and navigating hierarchically structured data, the computer instructions comprising: generating a display for displaying a structured diagram having a plurality of nodes; providing a navigation system for allowing a user to launch a viewport at a selected node within the structured diagram to view subnodes of the selected node; and maintaining a visual context between each of the plurality of nodes and subnodes within the structured diagram.

In a fourth embodiment, there is a method for deploying a system for displaying and navigating hierarchically structured data, comprising: providing a computer infrastructure being operable to: display a first structured diagram having a plurality of nodes; allow a user to launch a viewport at a selected node within the first structured diagram to view a second structured diagram showing subnodes of the selected node; and maintain a visual context between each of the plurality of nodes and the subnodes within the first and second structured diagrams.

The illustrative aspects of the present invention are designed to solve the problems herein described and other problems not discussed. Some advantages of the disclosed embodiments include: (1) the parent-child relationship is always visible, and this approach scales up for large diagrams; (2) the parent and child views can be displayed together; (3) viewports are persistent, resizable, and specialized for browsing hierarchical structures; and (4) objects at different logical scales (from different hierarchical levels) can be displayed at similar scale for easy viewing.

BRIEF DESCRIPTION OF THE DRAWINGS

These and other features of this invention will be more readily understood from the following detailed description of the various aspects of the invention taken in conjunction with the accompanying drawings.

Figure 1:
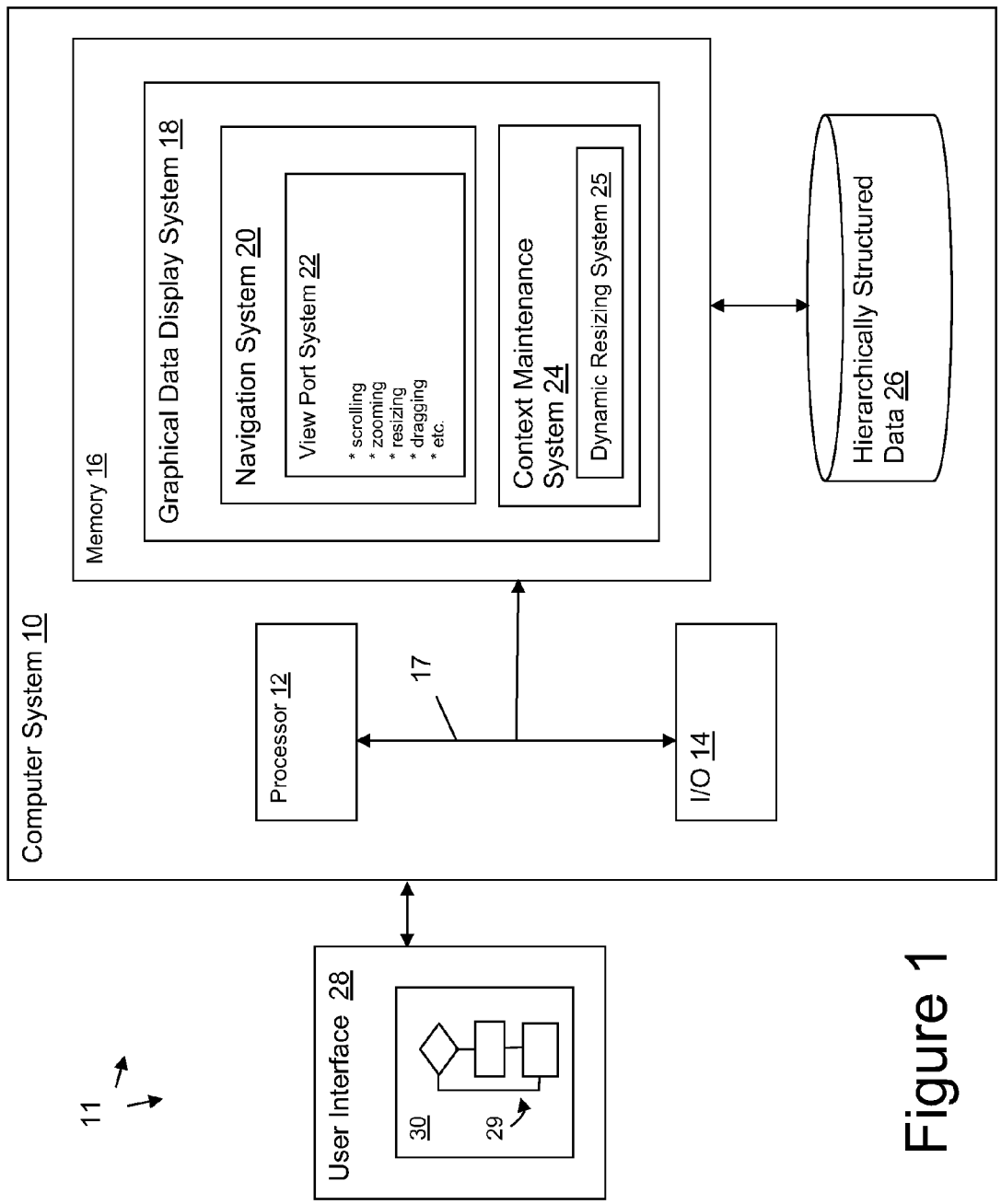
FIG. 1 depicts a computer system having a graphical display system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, a system 11 is provided for displaying and navigating hierarchically structured data 26. In this illustrative embodiment, a computer system 10 is provided having a graphical data display system 18 for generating a display 30 containing a structured diagram 29 to a user interface 28. In this embodiment, graphical data display system 18 is implemented as a computer program product stored in memory 16, which when executed, performs the functions described below. User interface 28 may comprise any type of system, device or program capable of displaying graphical information (e.g., a web browser, an LCD screen, a viewer, etc.). Further illustrative examples of display 30 are provided in FIGS. 2-8, described below.

Structured diagram 29 may comprise any type of visual representation of data in which nodes are visually connected or related. Illustrative structured diagrams 29 include, but are not limited to, flow diagrams, unified model language (UML) diagrams, system diagrams, workflow diagrams, data models, etc. For the purposes of this disclosure, the connections or relations that bind nodes within structured diagram 29 are referred to as "context." Within the structured diagram 29, context may be shown, e.g., using: arrows, lines, encapsulations, colors, connectors, etc. A node may comprise any type of object that is representative of some type of information, and is shown within structured diagram 29 using any type of visual indicator, e.g., a box, an icon, a shape, etc.

Graphical data display system 18 is utilized to display and navigate hierarchically structured data 26. Hierarchically structured data 26 may comprise any type of information in which nodes have relations to subnodes. For instance, a UML node may represent a particular routine in a computer program, e.g., a box that performs function A. Such a node however may have numerous subnodes (e.g., subroutines) that are required to implement the routine, e.g., perform function A1, then A2, then A3. In many cases, nodes may be nested to many levels, e.g., a parent node is related to a child node, which is related to a grandchild node (i.e., sub-subnode), etc.

The embodiments described herein provide an infrastructure in which hierarchically structured data 26 can be navigated while maintaining the overall context of the data. To implement this, graphical data display system 18 includes a navigation system 20 and a context maintenance system 24.

Navigation system 20 provides any now known or later developed technology for navigating a graphical display, e.g., a mouse and pointer, arrow keys, voice recognition, etc. In one particular aspect, navigation system 20 allows the user to select a node within the structured diagram 29 and launch a "viewport" via viewport system 22.

As described in further detail below in FIGS. 2-8, a viewport is essentially a window presented at the location of a selected node that shows subnodes at a lower hierarchical level. Accordingly, the viewport resides within and is part of an original structured diagram (i.e., at a parent level). In some cases, the subnodes at the child level displayed in the viewport are shown as a secondary structured diagram. In other cases, the subnodes may simply comprise data, e.g., lines of source code. Once a viewport is opened by viewport system 22, the user is able to perform any navigation or windowing function within the viewport, including, e.g., scrolling, zooming, resizing, dragging, repositioning, etc.

Context maintenance system 24 is utilized to maintain the context between and among nodes at a parent level and subnodes at a child level. In one particular aspect, context maintenance system 24 includes a dynamic resizing system 25 for dynamically resizing the appearance of the nodes when a viewport is opened, which, e.g., allows the child nodes to be viewed more prominently and the parent nodes to be viewed less prominently. Regardless, the context, e.g., lines, arrows, viewports, etc., are maintained in the original structured diagram 29, as well as any lower level structured diagrams.

Figure 2:
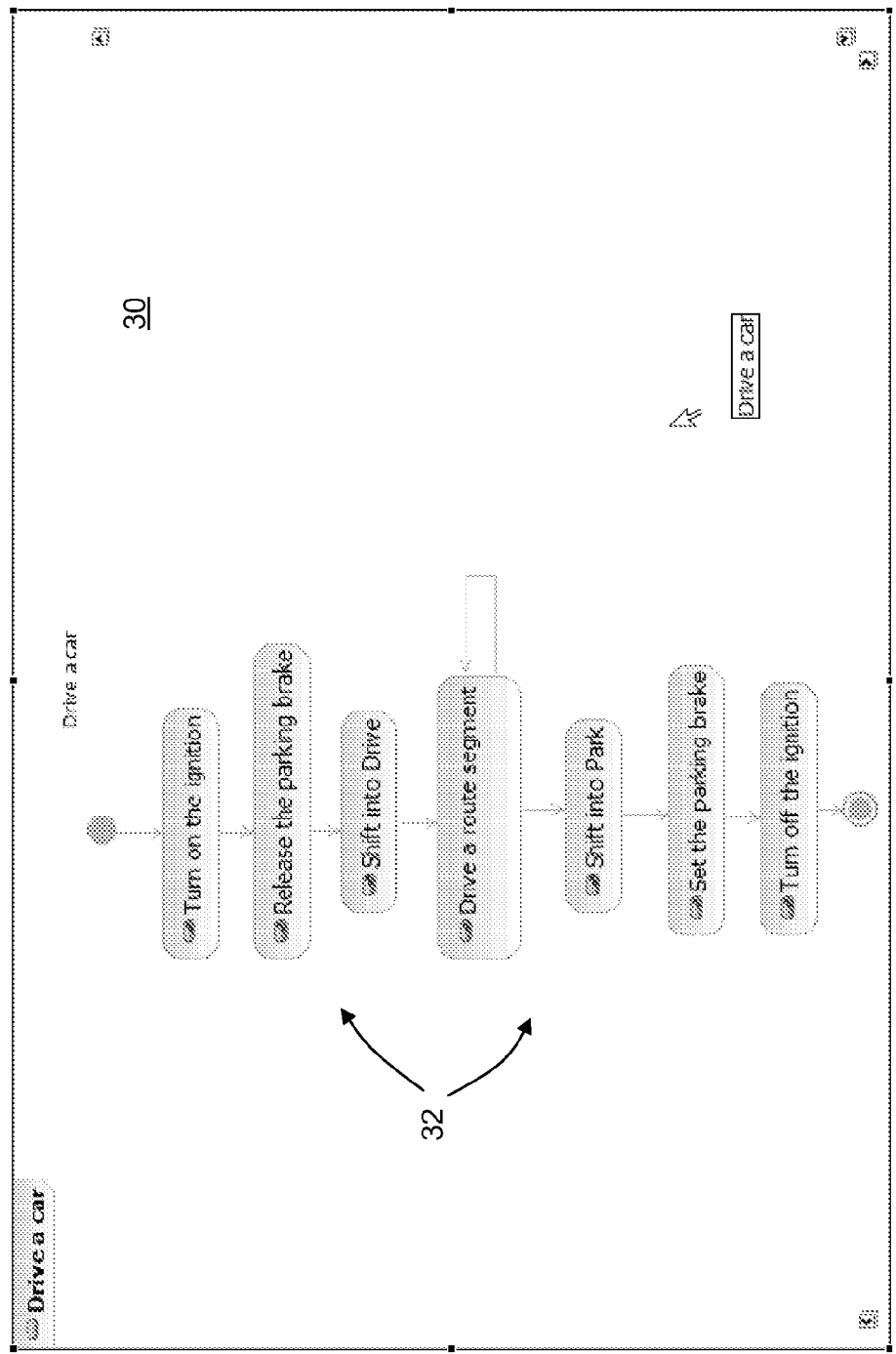
FIG. 2 depicts a graphical display showing a structured diagram in accordance with an embodiment of the present invention.
Figure 3:
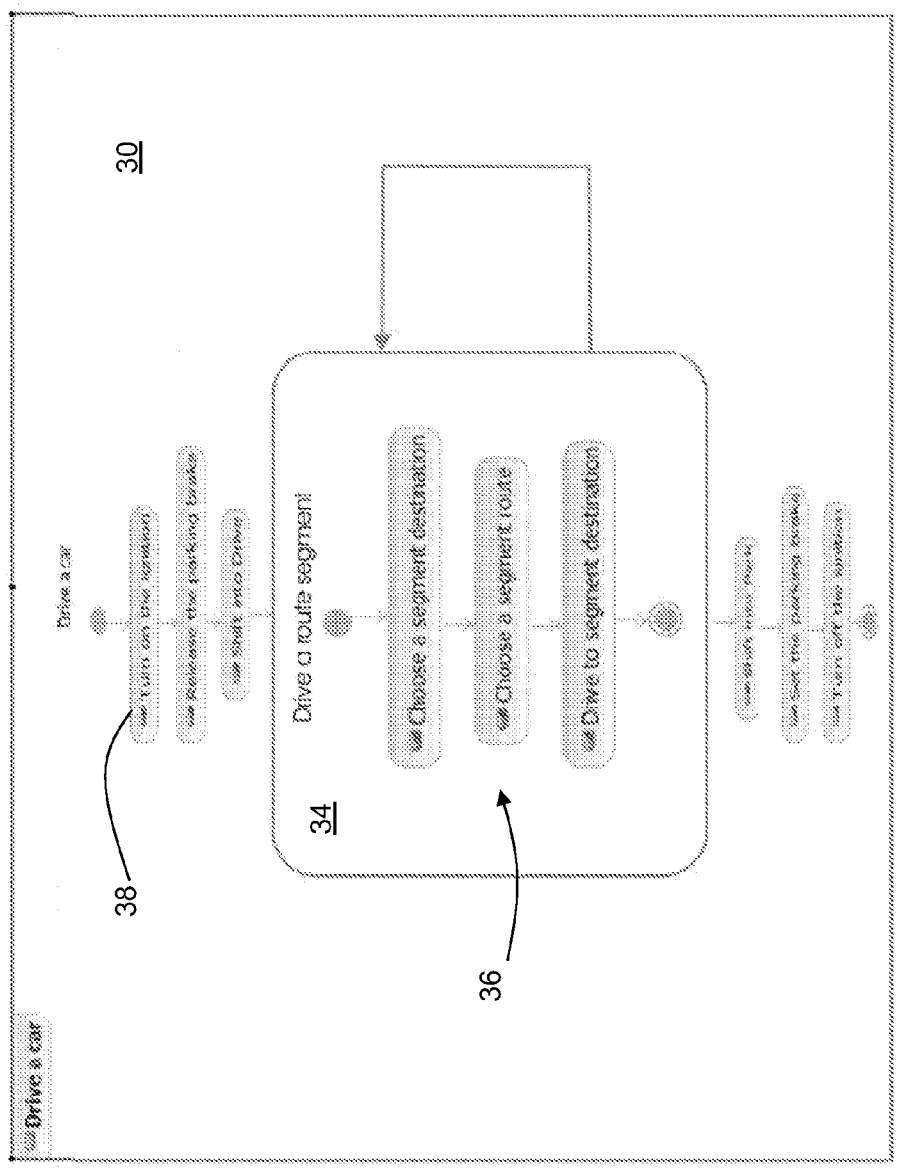
FIG. 3 depicts the graphical display of FIG. 2 with a viewport in accordance with an embodiment of the present invention.

FIGS. 2-8 provide illustrative applications of graphical data display system 18. FIG. 2 depicts a display 30 that includes a structured diagram 32, in this case a UML activity diagram, for performing the activity of driving a car. Each box (e.g., "Turn on the ignition") represents a node in the structured diagram 32. Arrows, which connect the boxes, provide the context. Optional text labeling outside the boxes or other markings could be used to provide additional context.

To inspect subnodes not presently shown in the structured diagram 32, the user selects a node (e.g., double-clicks the node). For example, in FIG. 3, the user selected the "Drive a route segment" node. A viewport 34 then appears in the display 30 at the location of the selected node, revealing a secondary structured diagram 36 that displays the children or subnodes of the chosen node. Of note is the fact that the original structured diagram remains in the display 30, thereby allowing the user to view the context of both the parent nodes and the child nodes in a single diagram. In this illustrative embodiment, the viewport 34 displays a secondary structured diagram 36 having three subnodes. As can be seen, the parent-level nodes are resized smaller (e.g., using a fisheye display algorithm) to allow the information in the viewport 34 to be optimally sized for viewing to create more space on the display 30 for the subnodes in the viewport 34. Any links to the selected parent node are displayed as links to the new viewport 34, thereby maintaining viewing context between nodes and subnodes.

Figure 4:
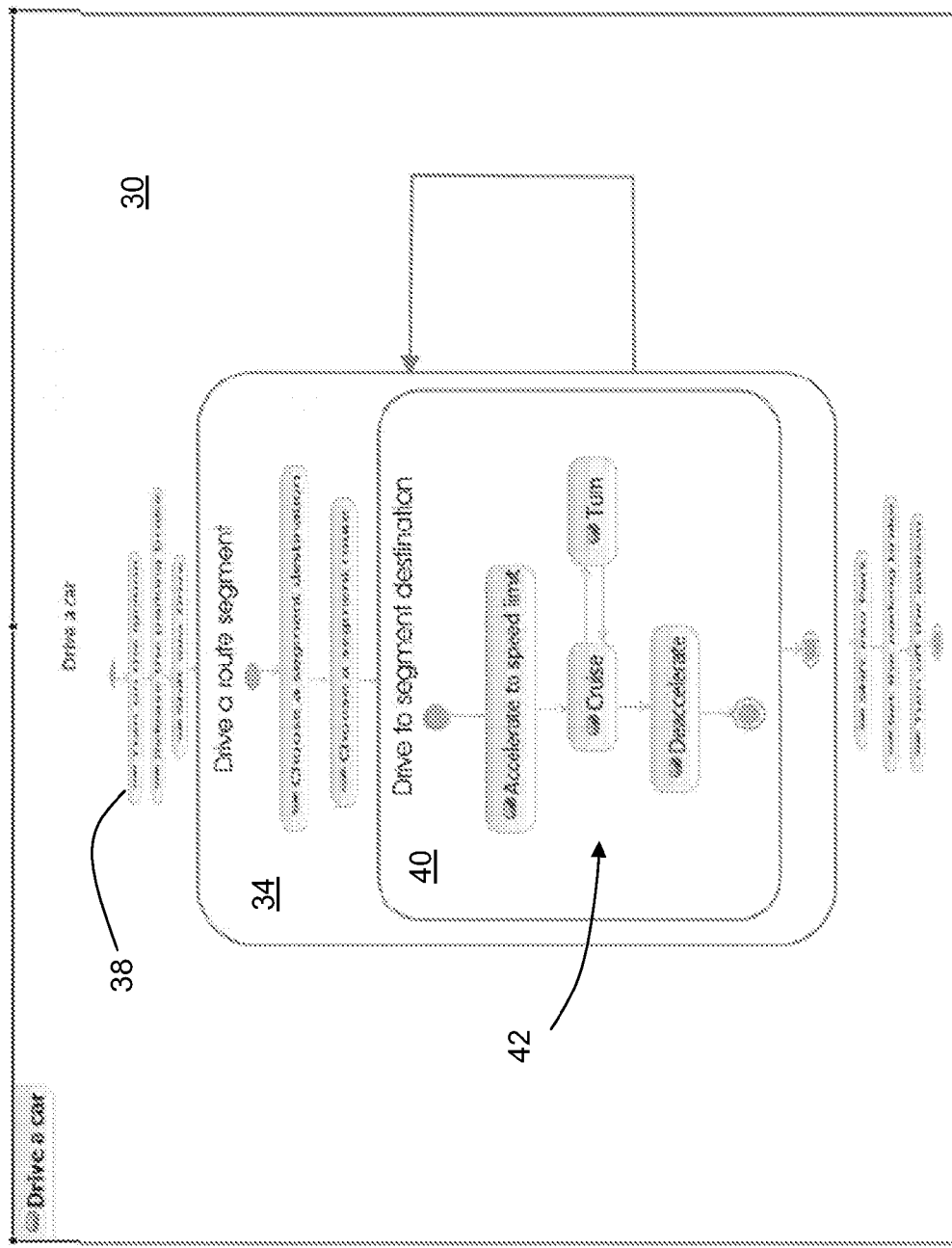
FIG. 4 depicts the graphical display of FIG. 3 with nested viewports in accordance with an embodiment of the present invention.

Users can drill down on a subnode inside the opened viewport 34 by selecting a subnode of interest, thus allowing nesting of viewports. In some applications, a fixed number of levels of nesting (e.g., three) may be a practical maximum; however, any number of levels could be used. When nesting viewports, each new viewport opened on a subnode will be bounded by its parent viewport. For example, FIG. 4 depicts the result of a user selecting the subnode "Drive to segment destination", which opens up a new viewport 40 embedded in the previous viewport 34 to reveal a further structure diagram 42 consisting of sub-subnodes (i.e., grandchild nodes). As can be seen, nodes in the original structure diagram and viewport 30 have been resized smaller.

Figure 5:
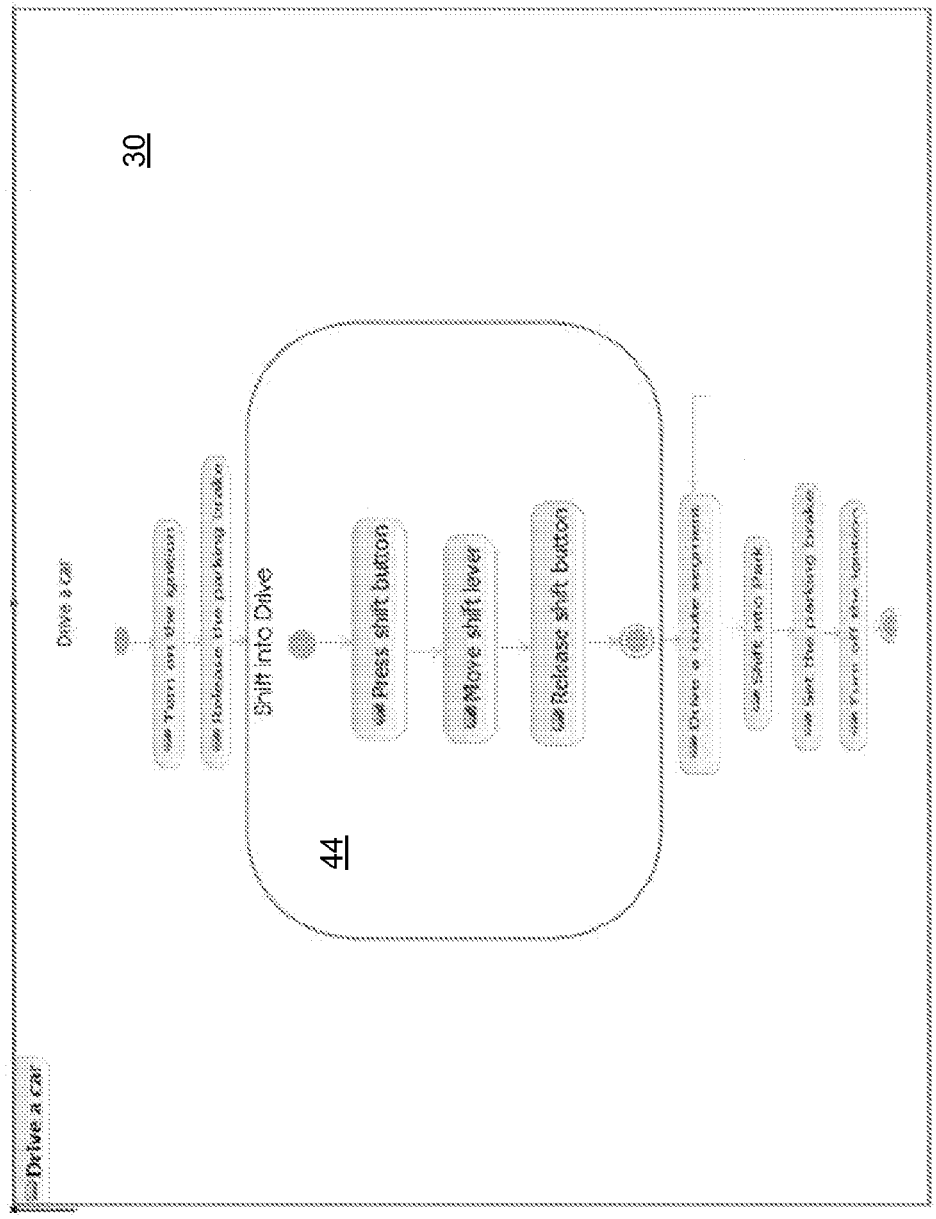
FIG. 5 depicts the graphical display of FIG. 2 with a viewport in accordance with an embodiment of the present invention.
Figure 6:
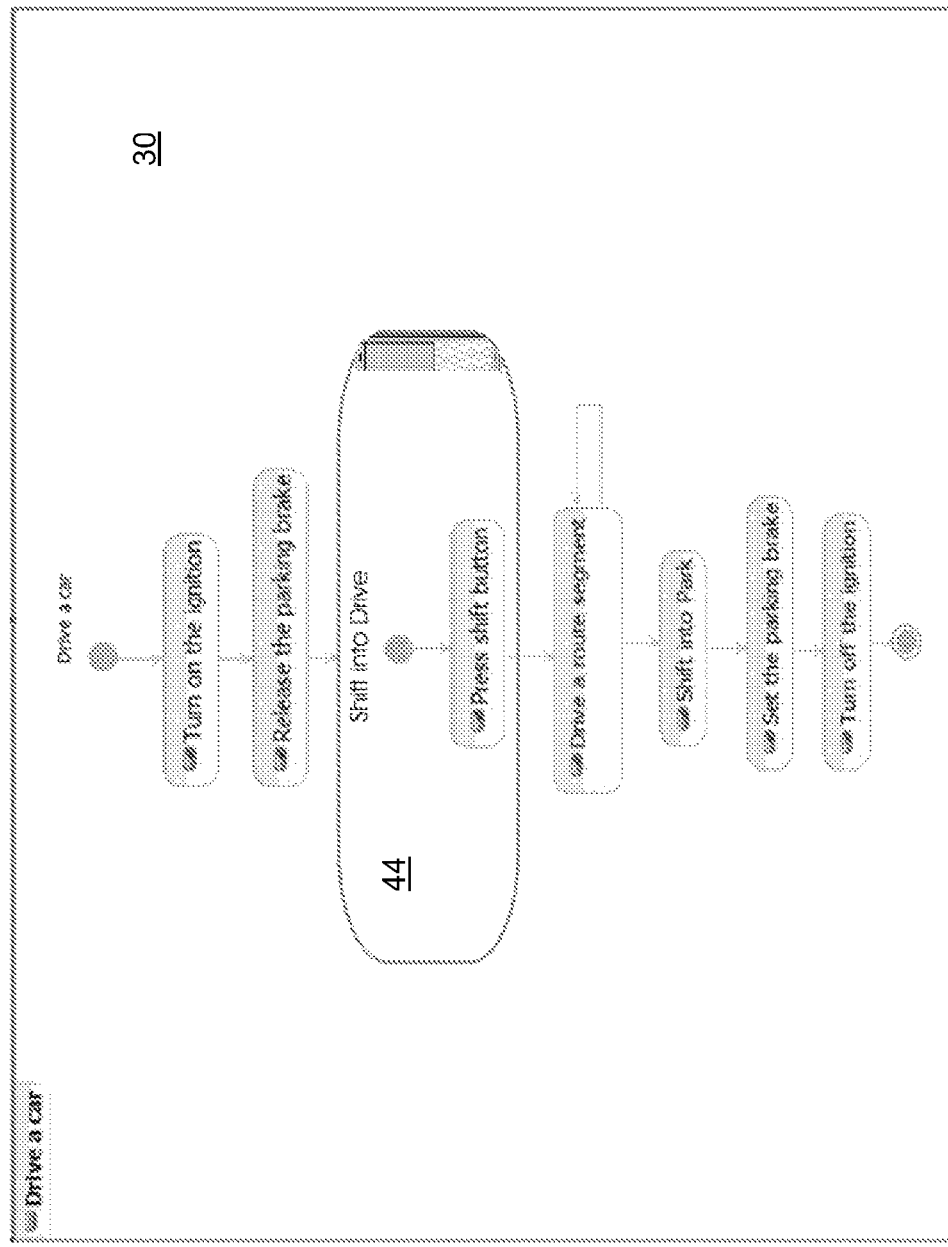
FIG. 6 depicts the graphical display of FIG. 5 with a viewport having a scroll bar in accordance with an embodiment of the present invention.

To provide a smooth transition during viewport changes, different effects can be used, e.g., fade-in and fade-out effects, color changes, sounds, highlighting, etc. In addition, as noted above, any type of navigation or windowing technique can be utilized on or within a viewport, e.g., scrolling, zooming, resizing, dragging, repositioning, etc. Thus, for instance, to control the number of child nodes visible at a lower level of structure, the user can resize a viewport by selecting it and then dragging its selection handles. For example, FIG. 5 depicts a viewport 44 showing all of the subnodes of the parent node "Shift into drive." FIG. 6 depicts a resized version of the viewport 44, which results in the addition of a scroll bar for repositioning data in the viewport 44. Objects in a viewport are available for editing or processing as supported by the containing application. Viewports can likewise be closed using any known windowing technique (e.g., clicking an X in the upper corner of the viewport).

Figure 7:
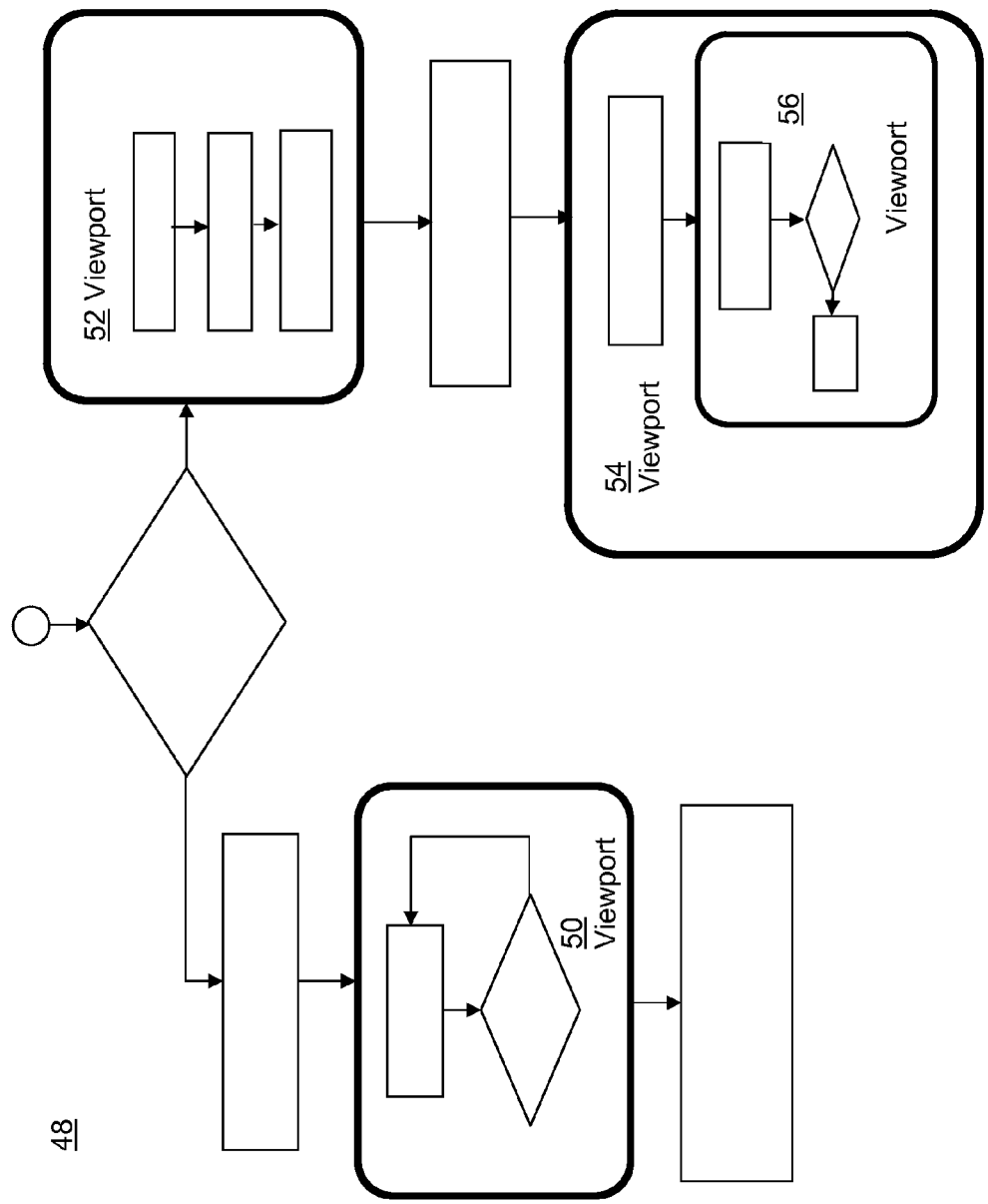
FIG. 7 depicts a graphical display showing a structured diagram having a plurality of viewports opened in accordance with an embodiment of the present invention.

FIG. 7 depicts a further illustrative display 48 in which four viewports 50, 52, 54 and 56 have been simultaneously opened. As is evident from this figure, not only can viewports be utilized to view parent child relationships while maintaining context, but other relationships, e.g., cousins, uncles, etc., can likewise be viewed. In this case, viewports 50 and 52 show cousins, while viewports 52 and 56 show uncle/nephew relationships. The overall context is maintained throughout.

Figure 8:
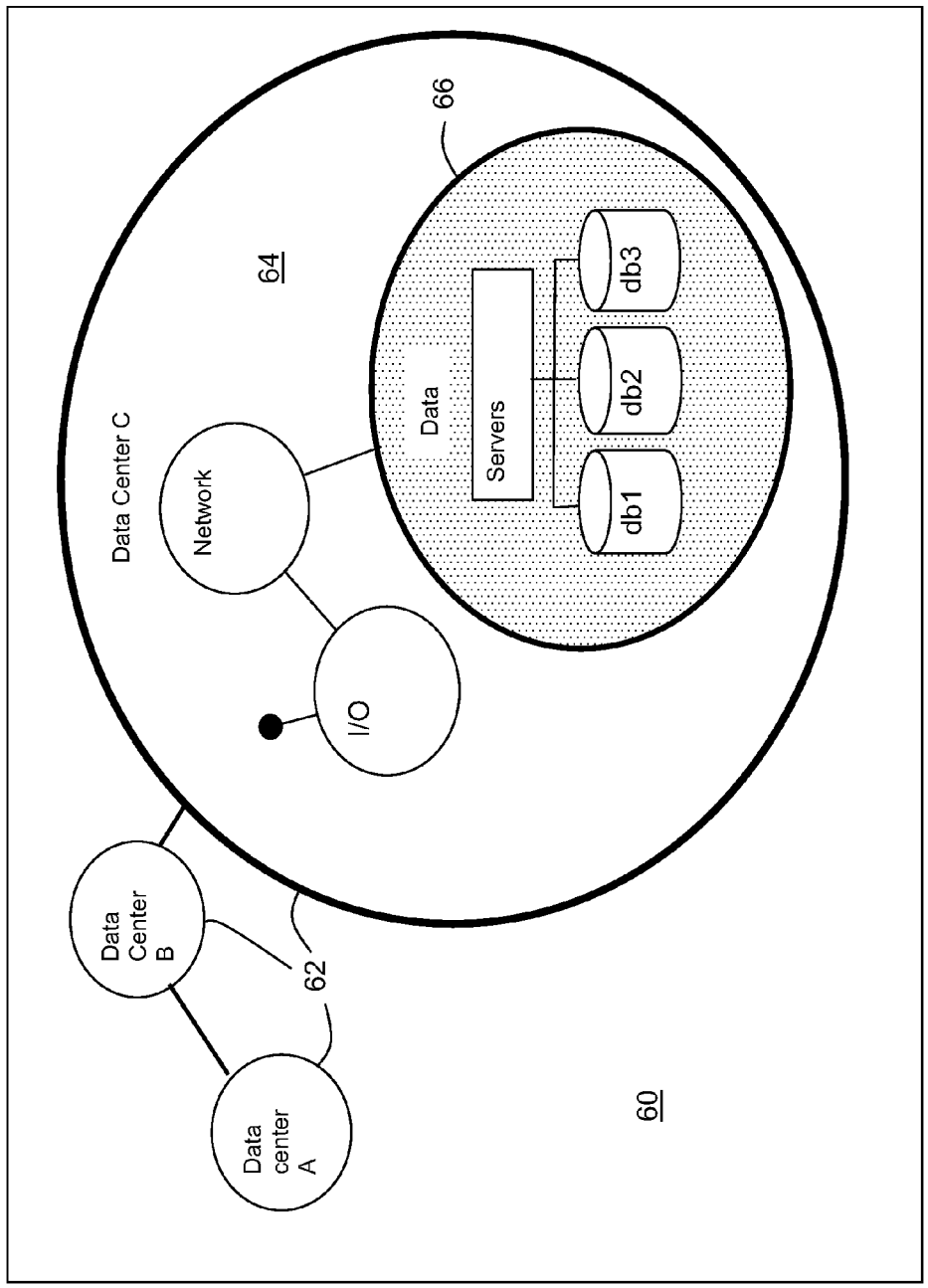
FIG. 8 depicts a graphical display of an information technology (IT) architecture showing a structured diagram having a plurality of viewports opened in accordance with an embodiment of the present invention.

FIG. 8 depicts a further illustrative example of a display 60 showing an information technology (IT) architecture having three parent nodes 62 (Data Center A, Data Center B, and Data Center C). In this example, a viewport 64 has been opened on Data Center C to reveal three subnodes (I/O, Network and Data). A further viewport 66 has been opened on the Data subnode to reveal further sub-subnodes consisting of servers, db2, db2 and db3. The user could further select the sub-subnodes to, e.g., show the server configuration, the data in a database (e.g., db1), etc.

It is understood that the features described herein are not limited to the specific applications described above, but rather could be applied to application involving hierarchically structured data. For instances, in a network storage application a set of storage drives may be represented as icons on a flat canvas to show the global view of the storage system. Users could then zoom in and out of the iconic view to navigate and inspect individual files that are stored in the system. The files could be physically stored spanning multiple network drives, but the in-context zooming and navigation would be at the level of logical hierarchical file structure.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a graphical data display system 18 could be created, maintained and/or deployed by a service provider that offers the functions described herein for customers. That is, a service provider could offer to deploy or provide the display and navigate hierarchically structure data 26 as described above.

It is understood that in addition to being implemented as a system and method, the features may be provided as a program product stored on a computer-readable medium, which when executed, enables computer system 10 to provide a graphical data display system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for displaying and navigating hierarchically structured data, comprising:
    a graphical data display system for displaying a structured diagram having a plurality of nodes;
    a navigation system for allowing a user to launch a first viewport at a selected node within the structured diagram to view subnodes of the selected node, and to launch a second viewport embedded within the first viewport to view sub-subnodes; and
    a context maintenance system that maintains a visual context between each of the plurality of nodes and the subnodes within the structured diagram wherein the visual context of both the plurality of nodes and the subnodes is in a single diagram.

2. The system of claim 1, wherein the viewport includes an interface that allows the user to scroll within the viewport.

3. The system of claim 1, wherein the viewport includes an interface that allows the user to zoom within the viewport.

4. The system of claim 1, wherein the viewport includes an interface that allows the user to resize the viewport.

5. The system of claim 1, wherein the viewport includes an interface that allows the user to reposition data within the viewport.

6. The system of claim 1, wherein the context maintenance system includes a system for dynamically resizing nodes and subnodes.

7. The system of claim 1, wherein the context maintenance system includes a system for dynamically altering a color or shading of nodes and subnodes.

8. The system of claim 1, wherein the navigation system further allows a user to select a subnode within the viewport and launch a second viewport to view sub-subnodes of the selected subnode.

9. A method for displaying and navigating hierarchically structured data, comprising:
    displaying a structured diagram having a plurality of nodes;
    launching a first viewport at a selected node within the structured diagram to view subnodes of the selected node and launching a second viewport embedded within the first viewport to view sub-subnodes; and
    maintaining a visual context between each of the plurality of nodes and the subnodes within the structured diagram wherein the visual context of both the nodes and the subnodes is in a single diagram.

10. The method of claim 9, wherein the viewport includes an interface that allows a user to scroll within the viewport.

11. The method of claim 9, wherein the viewport includes an interface that allows a user to zoom within the viewport.

12. The method of claim 9, wherein the viewport includes an interface that allows a user to resize the viewport.

13. The method of claim 9, wherein the viewport includes an interface that allows a user to drag content within the viewport.

14. The method of claim 9, wherein maintaining the visual context includes dynamically resizing nodes and subnodes.

15. The method of claim 9, wherein maintaining the visual context includes dynamically altering a color or shading of nodes and subnodes.

16. The method of claim 9, further comprising allowing a user to launch a second viewport at a selected subnode within a second structured diagram to view a third structured diagram showing sub-subnodes of the selected subnode.

17. A computer-readable storage medium storing computer instructions, which when executed, enables a computer system to provide an interface for displaying and navigating hierarchically structured data, the computer instructions comprising:
    generating a display for displaying a structured diagram having a plurality of nodes;
    providing a navigation system for allowing a user to launch a first viewport at a selected node within the structured diagram to view subnodes of the selected node and to launch a second viewport embedded within the first viewport to view sub-subnodes; and
    maintaining a visual context between each of the plurality of nodes and subnodes within the structured diagram wherein the visual context of both the plurality of the nodes and the subnodes is in a single diagram.

18. The computer-readable storage medium of claim 17, wherein the viewport includes an interface that allows a user to perform an action selected from the group consisting of: scrolling, zooming, resizing, repositioning and dragging.

19. The computer-readable storage medium of claim 17, wherein maintaining the visual context includes dynamically altering a color or shading of nodes and subnodes.

20. The computer-readable storage medium of claim 17, wherein the navigation system further allows a user to select a subnode in the viewport and launch a second viewport to view sub-subnodes of the selected subnode.

21. A method for deploying a system for displaying and navigating hierarchically structured data, comprising:
    providing a computer infrastructure being operable to:
        display a first structured diagram having a plurality of nodes;
        allow a user to launch a first viewport at a selected node within the first structured diagram to view a second structured diagram showing subnodes of the selected node, and to launch a second viewport embedded within the first viewport to view sub-subnodes; and
        maintain a visual context between each of the plurality of nodes and the subnodes within the first and second structured diagrams wherein the visual context of both the first and second structured diagrams is in a single diagram.

* * * * *